Jan. 22, 1935. H. M. WEIR 1,989,033
LIQUID VAPOR CONTACTING PROCESS AND APPARATUS
Filed Aug. 19, 1931 2 Sheets-Sheet 1
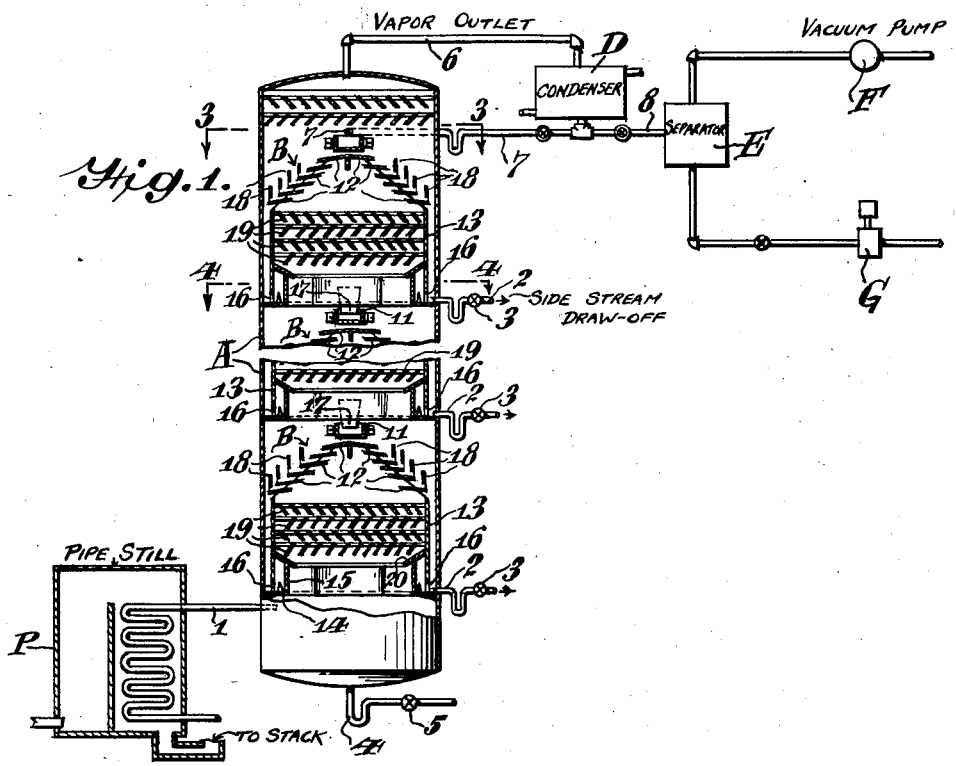
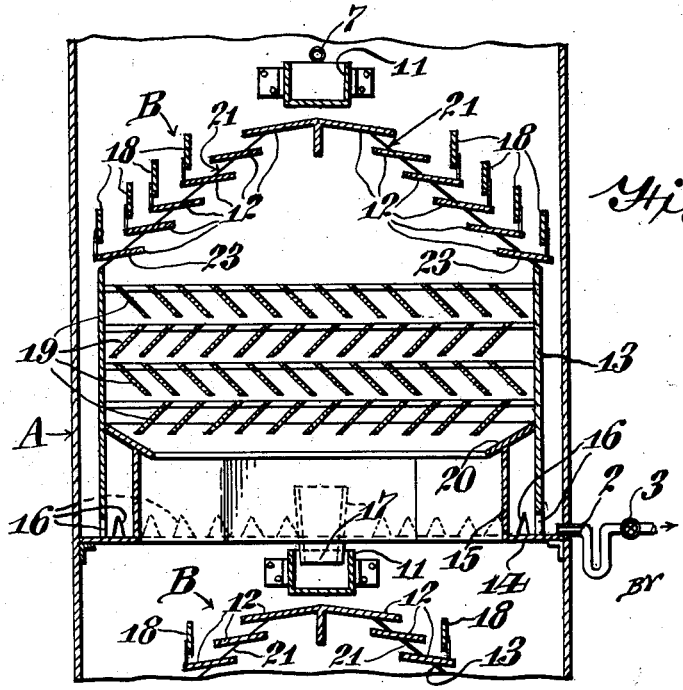

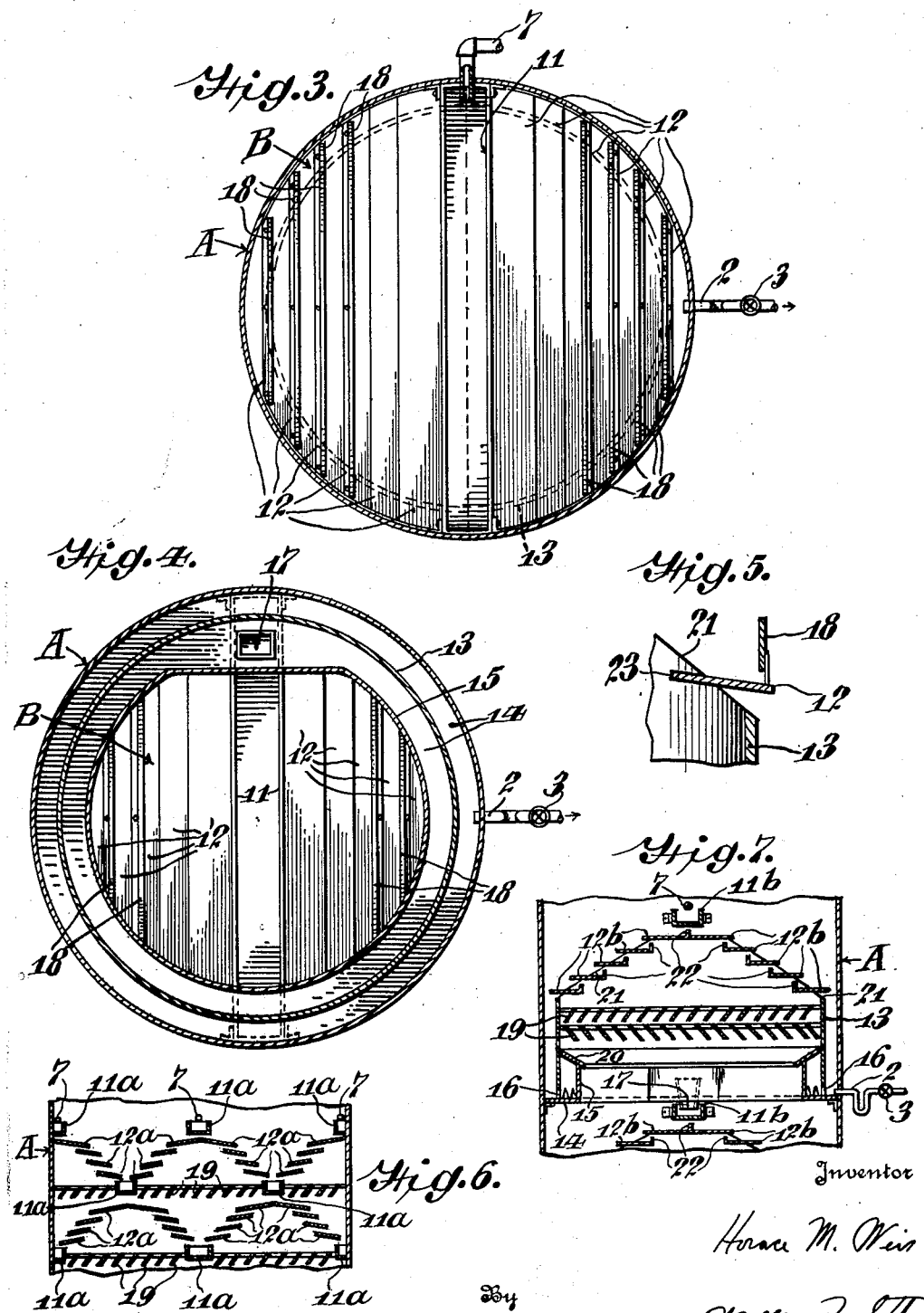

Patented Jan. 22, 1935

1,989,033

UNITED STATES PATENT OFFICE 1,989,033

LIQUID-VAPOR CONTACTING PROCESS AND APPARATUS

Horace M. Weir, Philadelphia, Pa., assignor to The Atlantic Refining Company, Philadelphia, Pa., a corporation of Pennsylvania Application August 19, 1931, Serial No. 558,046

8 Claims. (Cl. 261—111)

My invention relates to a process and apparatus for obtaining intimate contact between liquid and gases or vapors for the purpose of absorbing constituents of the gas in the liquid or for effecting fractionation of the vapors, and it is particularly applicable to the fractional distillation of hydrocarbon oils, including petroleum, more particularly when operating under subatmospheric pressure or vacuum.

In accordance with my invention the vapors or gas are brought into contact with the liquid in a series of spray-forming zones under such conditions that a spray or suspension of liquid in the vapor or gas is formed whereby, due to the large liquid surface thus exposed, interchange between the two phases may readily occur; before passing the vapors or gas into another spray-forming zone they are passed through a mist or entrainment-removing zone to effect separation of the entrained liquid.

More particularly in accordance with my invention the means for effecting contact between liquid and gases or vapors comprises a series of vertically-spaced, slat-like members, preferably arranged in such a manner that each member partially overlaps the next lower member in the series, and so spaced that the vapors may pass between the members and form a plurality of vapor streams, while descending liquid which flows over the upper surfaces of the several members, drops from the edges thereof into contact with the streams of vapor.

The usual method of operating fractionating columns is to pass vapors into and through pools of liquid maintained on the several plates of the column which are so designed that the vapors bubble through the liquid. It is customary to depend upon contact between the bubbles of vapors passing through the liquid to effect the desired interchange of constituents between the two phases and the columns are operated under such vapor velocities that the entrainment of liquid is kept as low as possible to avoid contamination of liquid on one plate with that which normally occurs on a lower plate.

My invention contemplates a radical departure from this method of operating in that it is my purpose to produce on or above each plate the maximum degree of entrainment and to form a foam which permits intimate contact between the vapors and liquid after which the foam or mist is passed to a deentraining zone wherein the liquid is removed from the vapors.

In absorbing constituents of gas in liquid or in the fractionation of vapors by interchange of constituents with reflux liquid, the efficiency of the operation depends upon the intimacy of contact between the liquid and the gas or vapor. In distillation under subatmospheric pressure or vacuum, it is desirable that there be a low pressure drop through the fractionating equipment, in order that the absolute pressure maintained in the vaporizing section of the column may be as low as possible.

The fractionating device contemplated by this invention is particularly advantageous for these purposes in that by reason of the suspension of liquid in the vapors, it affords intimate contact between the two phases and there is a low pressure drop in passing through the plate.

The latter advantage results from (1) the elimination of the hydrostatic head of the pool of reflux liquid characteristic of the usual fractionating plates and (2) the relatively large vapor uptake area which may be more than 50%, and as high as 80%, or more, of the cross-sectional area of the column, as opposed to the usual type of fractionating plate in which the vapor uptake area does not generally exceed 10% of the cross-sectional area.

For a more complete understanding of this invention, reference is to be had to the accompanying drawings in which Fig. 1 illustrates diagrammatically a fractionating column equipped with fractionating devices contemplated by this invention.

Fig. 2 is a vertical sectional view through one form of the fractionating device.

Fig. 3 is a horizontal sectional view on line 3—3 of Fig. 1.

Fig. 4 is a horizontal sectional view on line 4—4 of Fig. 1.

Fig. 5 is a detail of Fig. 2.

Fig. 6 is a vertical sectional view of a modified form of the invention.

Fig. 7 is a vertical sectional view of another modified form of the invention.

In Fig. 1, A represents a fractionating column provided with a vapor inlet 1 leading from a suitable source of vapors, for example, the pipe still P. The several drawoff lines 2 controlled by the valves 3 are disposed at various levels in the column. At the lower end there is provided a liquid drawoff 4 controlled by the valve 5, while at the upper end the vapor outlet 6 leads to a condenser D. This condenser is equipped with return line 7 which supplies a portion of the condensate to the upper end of the column as reflux liquid, and line 8 which transfers the remainder of the condensate and uncondensed vapor to separator E. A vacuum pump F is provided in the vapor outlet of the separator, and in operation maintains subatmospheric pressure throughout the system. Liquid is withdrawn from the bottom of the separator by means of pump G. At suitable elevations in the column are fractionating devices or plates B.

Referring to Figure 2 which shows the details of the fractionating device B, there is provided, extending horizontally across the column A, a liquid distributing vessel 11, the upper edges of which are preferably provided with notches or serrations, through which liquid overflows onto the inclined spaced slat-like members or louvers 12, arranged in series, each member of the series being at a lower level and spaced farther horizontally from the vessel 11 than the preceding member, thus forming a sloping series of louvers. With the distributing vessel 11 centrally located, as shown, two counterpart series of louvers 12 are installed, one on each side of the distributing trough.

To support the slat-like members or louvers 12, there is provided an open ended cylindrical member 13, the upper portion of which is cut away on an angle corresponding substantially to the angle of slope of the series of louvers. The sloping edges 21 of the member 13 are provided with slots 23, shown in detail in Fig. 5, into which the louvers are fitted in such a manner that the extremities thereof extend slightly beyond the wall of the member 13. The louvers are held in place in the slots by any suitable means, for example, by welding.

Below the system of louvers above described, there is provided an annular liquid collecting trough 14, the outer wall of which may, as illustrated, be formed by the wall of the column A, while the wall 15 constitutes the inner boundary. The lower end of the open-ended cylindrical member 13 dips into the trough 14, and may be either provided with apertures 16 in the lower edge, as shown in Fig. 2, or may be spaced somewhat above the floor of the trough to provide communication between the inner and outer sections of the trough thus formed. There is provided in the liquid collecting trough 14, a liquid downflow pipe 17, the upper end of which extends above the floor of the trough 14 and terminates below the upper edge of the wall 15, the lower end of the downflow pipe preferably terminating below the trough 14 and discharging into the liquid distributing trough 11 of the next lower plate. The liquid collecting trough 14 may be widened adjacent to the downflow pipe to permit the installation of this pipe between the outer wall 15 and the member 13, as shown in Fig. 4. The lower end of member 13 extends below the upper edge of the downflow pipe and when apertures 16 are provided in the member 13 they are placed below the upper edge of the downflow pipe 17, thus forming a liquid seal to prevent passage of vapors between the member 13 and the wall of the column.

Opposite the spaces between the several louvers 12 there are preferably provided the vertical baffles 18, and there are also provided below the lowermost and above the uppermost fractionating devices, as well as between intermediate ones, the inclined baffles 19 or other suitable means, such as steel wool or other packing in the form of a filamentous mass having for example, in excess of 90% voids, for removing entrained liquid from the rising vapors, as described in detail in Peterkin application Serial #545,224, filed June 18, 1931. The deflector 20 extending from the inner wall of the cylindrical member 13 to and beyond the inner wall 15 of the trough 14 prevents liquid removed by the baffles 19 from collecting in the trough 14. Any number of plates of the general type above described may be installed in a column, dependent upon the degree of fractionation desired.

To permit removal of a liquid fraction or fractions from the column, one or more of the liquid collecting troughs 14 may be provided with a liquid drawoff 2, controlled by suitable means, such as valve 3 to regulate the amount of liquid withdrawn, or there may be substituted in lieu thereof, a flow-box, of the type described in Chillas Reissue Patent #17,595, issued February 18, 1930, which may be placed in any desired position.

In fractionating oil vapors in the column A equipped with the apparatus described above, the vapors with or without unvaporized liquid oil are introduced, for example, from the pipe still P through the inlet 1 at the lower extremity of the column and pass upwardly through the several plates B in each of which the vapors are divided into a number of streams in passing through the spaces between the several louvers constituting the individual plates. The vapors in rising through the column pass countercurrent to reflux liquid admitted through line 7 into the uppermost distributing vessel 11 from which it overflows onto the uppermost louver 12 of the top plate and descends through the column. At each plate the liquid overflows in similar manner and the procedure on each series of louvers in each plate is the same. From the lower edge of the upper louver the liquid falls into the stream of vapors passing between this louver and the one next below. A portion of the liquid drops through the vapors onto the upper surface of the next lower louver 12, the remainder of the liquid is broken into a fine mist or spray and is carried upwardly by the vapors. The fine mist or spray of liquid in the vapors permits a vary rapid transfer of heat and/or constituents between the two phases so that a high degree of fractionation is obtained.

The flow of the vapors issuing between the louvers is relatively horizontal and upon entering the free space above the plate or upon striking against the vertical baffles 18 which are preferably provided, the direction of flow of the vapors becomes substantially vertical, thereby causing a portion of the liquid particles entrained by the vapors in the form of mist or spray to separate therefrom and drop onto lower louvers of the plate on which the entrainment was effected. The vapors partially freed from entrained liquid pass into contact with the baffles or mist extractors 19, whereby substantially all of the remaining suspended liquid particles are removed and the relatively dry vapor passes into the next higher fractionating zone. The liquid separated from the vapors by means of the baffles drops onto the louvers of the plate below said baffles and flows over the upper surfaces thereof falling from the lower edges into the vapor streams issuing from beneath the several louvers. Again a portion of the liquid falls through the vapors and the remainder is entrained therein, after which the suspended particles are removed by contact with the baffles. As operation of the tower is continuous, this disentrained liquid is continuously mixed with the reflux from vessel 11.

By the action thus described, intimate contact is obtained between the rising vapors and the suspended liquid particles which present a large surface area to the vapors and effect fractionation by permitting interchange of heat and/or constituents between them. In effect, the process consists of flowing liquid as a film over a louver to the edge thereof, permitting a portion to fall through the vapor and entraining the remainder in the rising vapors to form a mist or spray, removing the entrained liquid particles and returning the liquid to lower louvers of the plate upon which it was entrained where it is again brought into contact with the vapors and is again separated and returned. The general course of the liquid, therefore, on any one plate is oblique to the longitudinal axis of the column, and in a downward direction. The efficiency of fractionation depends upon intimate contact between the liquid and vapor, which according to this invention is obtained to a high degree due to the fact that the maximum entrainment is obtained, whereupon, to prevent contamination of the liquid on the next higher plate, the liquid particles suspended in the vapors are removed therefrom by means of the baffles or other mist removing means.

The relatively small vapor uptake area of prior fractionating devices causes a considerable pressure drop through the fractionating column and a consequent decrease of operating efficiency, particularly when subatmospheric pressure is employed. By the system of louvers used in accordance with my process the vapor uptake area is limited only by the thickness of each louver and the height of the device. Regulation of the height of the device allows a wide variation in vapor uptake area which may range from substantially zero to 80% or more of the cross-sectional area of the column. In the preferred embodiment of my invention the vapor uptake area of each plate is 50% or more of the cross-sectional area of the column, so that the rate of vapor flow through the plate is less than twice the velocity through the free space of the column. However, desirable results may be obtained by decreasing the vapor uptake area, whereby the vapor velocity through each device is in excess of twice the velocity through the column.

The liquid upon reaching the lowermost louver of the series drops into the space between the wall of the column A and the cylindrical member 13 and collects in the trough 14, passing through the apertures 16 in the louver support 13. As described, the liquid collecting trough is so constructed as to insure sufficient depth of liquid to seal the lower end of the cylindrical member 13 so that vapors passing upwardly through the column do not enter the space between the wall of the column and the cylindrical member 13 and therefore must flow through the spaces between the louvers 12.

Liquid fractions may be removed from the column at various elevations, for example, from one or more of the collecting troughs 14 through the line 2 controlled by the valve 3, or other regulating device. The portion of the liquid that is not withdrawn descends through the downflow pipe 17 to the liquid distributing trough of the next lower plate. In most instances all of the liquid collecting in the trough 14 of the plate immediately above the vapor inlet will be conducted from the column through the pipe 2 associated therewith.

While my invention has been described with particular reference to the entrainment of a considerable portion of the freely falling liquid in the vapors, followed by separation of the mist or spray so formed and return of the separated liquid to a point on the plate adjacent to that from which it was entrained, operation at lower vapor velocities with less entrainment is also contemplated. In any event that portion of the liquid which is not entrained by the vapors flows over the louvers and forms a progressive series of cascades of freely falling liquid.

Modifications of the structure above described are shown in Figs. 6 and 7. In Fig. 6, the single liquid distributing vessel 11 is replaced by several such vessels 11a and a complementary number of series of cascading louvers. The louvers 12b in the modification shown in Fig. 7 are horizontal rather than inclined and the inner edge of each louver is upturned to form a wall or dam to prevent the flow of liquid over this edge without cascading over the entire series, and thus insures that the maximum contact with the vapors will be obtained.

Further modifications may be made in the structure without departing from the spirit of the invention, for example, a rectangular column may be used, or in a round column, the straight slat-like members or louvers may be replaced by a series of annular louvers of progressively increasing or decreasing diameter so arranged that liquid fed onto the uppermost louver from a central distributing vessel will flow over the series and vapors will pass through the spaces between the several annular louvers. The annular louvers may be horizontal or may be sloped toward the center or toward the wall of the column, the slope depending upon whether the louvers are of progressively decreasing or increasing diameter.

The method of supporting the louvers 12 heretofore described is for the purpose of illustration only and other means may be used in lieu thereof. Thus, the louvers may be supported on a peaked frame suitably secured to the column and sloping horseshoe shaped liquid collecting troughs may be provided immediately below the ends of the louvers which preferably fit closely to the wall of the column.

While in the apparatus as described each of the several louvers 12, 12a and 12b partially overlaps the next lower one in the series to insure that all the liquid shall flow over the louvers rather than drop between them, the high vapor velocities which result when operating at subatmospheric pressure are generally sufficient to carry the liquid outwardly so that the louvers may be installed, if desired, without overlapping.

As indicated hereinbefore, my invention may be employed to advantage while operating under atmospheric pressure. However, in combination with the use of vacuum, certain results pertaining to efficient fractionation and maintenance of a small pressure drop through the column are obtained which make this modification particularly desirable.

For the purpose of clearness, my invention has been described with some particularity, but it is susceptible of other embodiments coming within the appended claims.

In one aspect of my invention the vapors rising through the column are divided at intervals into a number of streams, each of which is in contact with freely falling liquid, and, after passing under the several louvers of each fractionating zone, the streams of vapors unite to form a single stream which passes through the mist removing means and is again divided into a number of streams in the next fractionating zone. While passing through a particular fractionating zone, the various streams of vapors are at substantially uniform temperature.

What I claim is:

1. A process of fractional distillation, which comprises passing vapors though a series of fractionating zones countercurrent to reflux liquid, in each zone causing the reflux liquid to flow in a progressive series of cascades of freely falling liquid, dividing the vapors into a number of streams corresponding to the number of said cascades, bringing the cascades of freely falling liquid into contact with said streams of vapor while maintaining the vapors as the continuous phase, whereby comminuted particles of liquid are entrained in said vapors, and separating the liquid particles from the vapors prior to passing the vapors to the next fractionating zone.

2. Apparatus for fractional distillation, comprising a column, a plurality of liquid-vapor contacting means spaced vertically from each other and disposed at intervals therein, each comprising a liquid distributing vessel, a distributing member partially underlying said vessel and sloping in its shorter axis downwardly toward the wall of the column, a series of louvers, each member of the series spaced from and lying in a lower horizontal plane than the preceding member, the lower edge of each member vertically overlapping the upper edge of the member next below it.

3. The process of fractional distillation of composite liquids which comprises passing the vapors of a composite liquid through a series of spray-forming zones countercurrent to reflux liquid passed through said spray-forming zones, bringing the vapors into contact with freely falling streams of reflux liquid in a spray-forming zone to cause liquid to be suspended in and carried forward by the vapors as a spray, passing the mixture of vapors and liquid particles thus formed into contact with mist removing means, whereby suspended liquid particles are removed from the vapors, returning the liquid particles thus removed to the spray-forming zone in which they were entrained by the vapors, and passing the vapors substantially free from entrained liquid into contact with freely falling streams of reflux liquid in a second spray-forming zone.

4. The process of fractional distillation of composite liquids which comprises passing the vapors of a composite liquid through a series of spray-forming zones countercurrent to reflux liquid passed through said spray-forming zones, bringing the vapors into contact with freely falling streams of reflux liquid in a spray-forming zone to cause liquid to be suspended in and carried forward by the vapors as a spray, passing the mixture of vapors and liquid particles thus formed into contact with mist-removing means whereby suspended liquid particles are removed from the vapors, returning the liquid particles thus removed to the spray-forming zone in which they were entrained by the vapors and passing the vapors substantially free from entrained liquid into contact with freely falling streams of reflux liquid in a second spray-forming zone and withdrawing from a spray-forming zone that portion of the reflux liquid which is not suspended in the vapors and collecting it in a pool from which it is passed, while out of contact with the vapors, to an earlier spray-forming zone in the series.

5. The process of fractional distillation of composite liquids which comprises passing the vapors of a composite liquid through a series of spray-forming zones countercurrent to reflux liquid passed through said spray-forming zones, dividing the vapors into a plurality of streams, causing reflux liquid to pass in freely falling streams into the streams of vapors whereby liquid is suspended in and carried forward by the vapors as a spray, passing the mixture of vapors and liquid particles thus formed into contact with mist removing means, whereby suspended liquid particles are removed from the vapors, returning the liquid particles thus removed to the spray-forming zone in which they were entrained by the vapors, and passing the vapors substantially free from entrained liquid into contact with freely falling streams of reflux liquid in a second spray-forming zone.

6. Apparatus for effecting contact between liquid and vapors comprising a column, a centrally disposed elongated liquid distributing vessel positioned therein, a liquid collecting trough in a lower horizontal plane than said vessel, a series of elongated members lying below and parallel to said distributing vessel spaced vertically from each other to form unobstructed vapor passages therebetween and adapted to cause liquid overflowing from said distributing vessel to flow to said collecting trough while permitting passage of vapors through the spaces between the members.

7. Apparatus for fractional distillation, comprising a column, a plurality of liquid-vapor contacting means spaced vertically from each other and disposed at intervals therein, each comprising a liquid distributing vessel, a distributing member partially underlying said vessel and sloping in its shorter axis downwardly toward the wall of the column, a series of louvers, each member of the series spaced from and lying in a lower horizontal plane than the preceding member, the lower edge of each member vertically overlapping the upper edge of the member next below it, a liquid collecting vessel at a lower level than the lower end of the series of louvers and adapted to collect liquid discharged therefrom and means to convey liquid from said collecting vessel to the liquid distributing vessel of a lower liquid-vapor contacting means while out of contact with rising vapors.

8. A process of fractional distillation, which comprises passing vapors through a series of fractionating zones countercurrent to reflux liquid, in each zone causing the reflux liquid to flow in a progressive series of cascades of freely falling liquid, dividing the vapors into a number of streams, bringing the cascades of freely falling liquid into contact with said streams of vapor while maintaining the vapors as the continuous phase, whereby comminuted particles of liquid are entrained in said vapors, and separating liquid particles from the vapors prior to passing the vapors to the next fractionating zone.

HORACE M. WEIR.